April 6, 1926.
R. T. McCONLOGUE
1,579,555
TRAFFIC SIGNAL DEVICE FOR MOTOR OR OTHER VEHICLES
Filed June 21, 1924    2 Sheets-Sheet 2
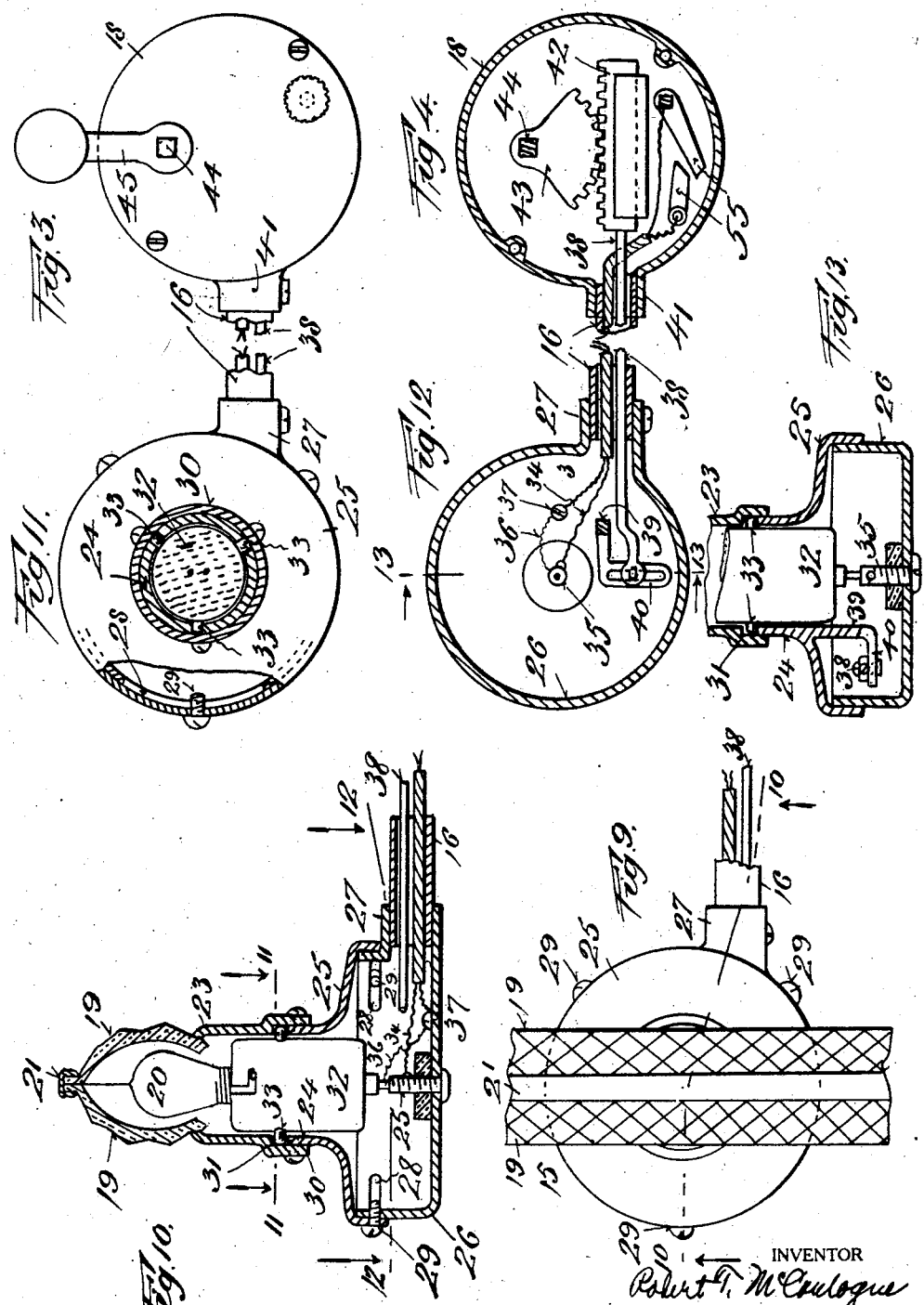

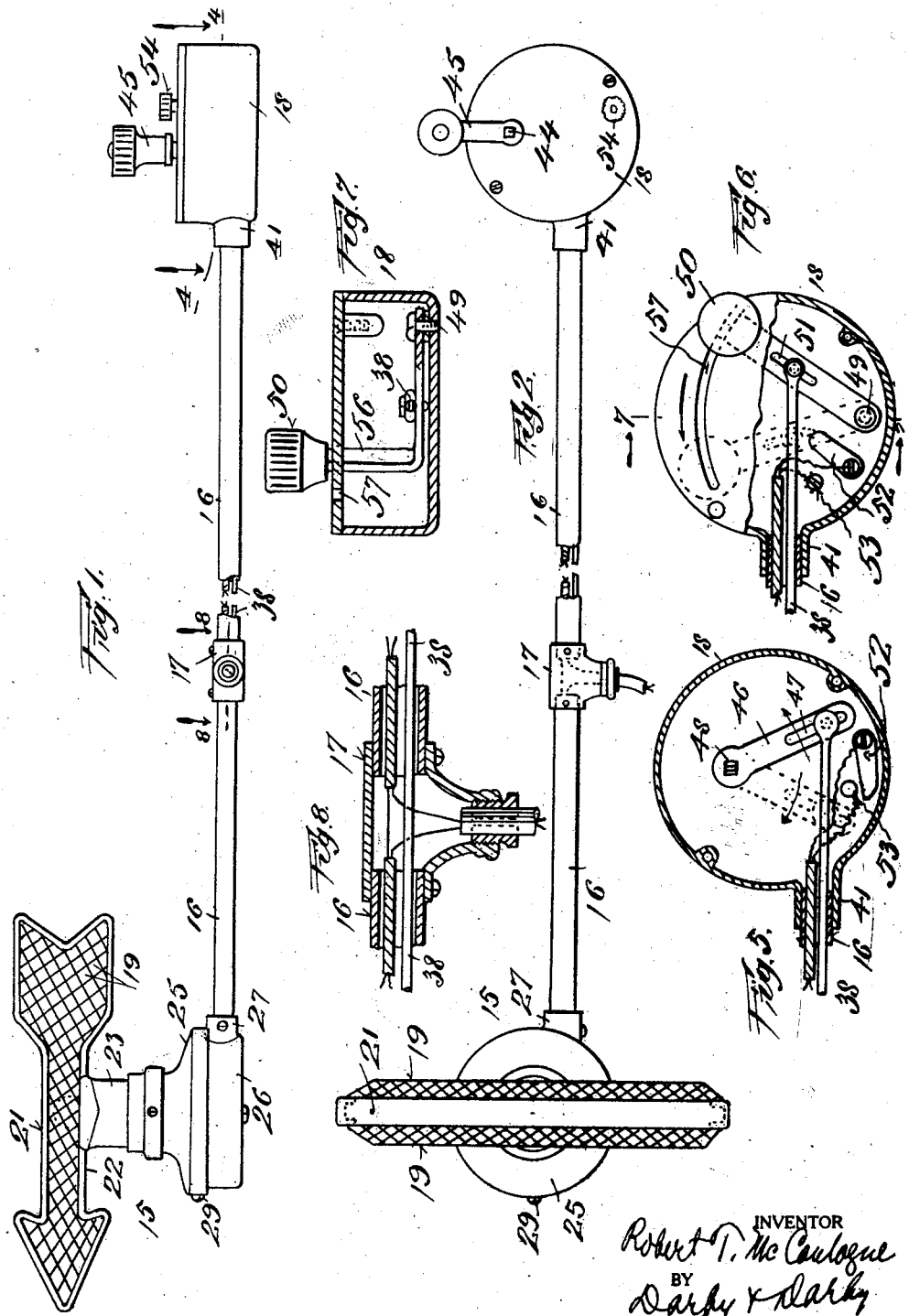

Patented Apr. 6, 1926.

1,579,555

UNITED STATES PATENT OFFICE.

ROBERT T. McCONLOGUE, OF FREEPORT, NEW YORK.

TRAFFIC-SIGNAL DEVICE FOR MOTOR OR OTHER VEHICLES.

Application filed June 21, 1924. Serial No. 721,385.

*To all whom it may concern:*

Be it known that I, ROBERT T. McCON-LOGUE, a citizen of the United States, residing at Freeport, county of Nassau, State of New York, have made a certain new and useful Invention in Traffic-Signal Devices for Motor or Other Vehicles, of which the following is a specification.

This invention relates to traffic and signal devices for motor and other vehicles, and other purposes.

The object of the invention is to provide a traffic or signal device for motor or other vehicles and the like, which is simple in structure, economical to manufacture and easy to apply, and which is efficient in operation.

A further object is to provide a traffic or signal device capable of use in daylight or at night for indicating to others a contemplated change in direction or other manœuvre of a motor or other vehicle, in advance of the inauguration of such movement or manœuvre, and which device is manually operable.

Other objects of the invention will appear more fully hereinafter.

The invention consists substantially in the construction, combination, location and relative arrangement, all as will be more fully hereinafter set forth, as illustrated in the accompanying drawings, and finally pointed out in the appended claims.

In the accompanying drawings:—

Fig. 1 is a view in side elevation, parts broken off, of a traffic or signal device embodying the principles of my invention.

Fig. 2 is a similar view of the same in top plan.

Fig. 3 is a view in top plan showing the casing and lever mounted thereon for operating the signal.

Fig. 4 is a view in section on the line 4, 4, Fig. 1, looking in the direction of the arrows, showing one form of operating mechanism for the signal device.

Figs. 5 and 6 are views similar to Fig. 4, showing modified forms of operating mechanism embraced within the scope of my invention.

Fig. 7 is a view in section on the line 7, 7, Fig. 6, looking in the direction of the arrows.

Fig. 8 is a broken detail view in section on the line 8, 8, Fig. 1, looking in the direction of the arrows.

Fig. 9 is a view in top plan of the signal device proper, parts being broken off.

Fig. 10 is a view in section on the line 10, 10, Fig. 9, looking in the direction of the arrows.

Figs. 11 and 12 are similar views on the lines 11, 11 and 12, 12, respectively, of Fig. 10, looking in the direction of the arrows.

Fig. 13 is a similar view on the line 13, 13, Fig. 12, looking in the direction of the arrows.

The same part is designated by the same reference numeral wherever it occurs throughout the several views.

The most common method now employed by drivers of motor and other vehicles to indicate to traffic officers and others an intended change in direction of travel or other manœuvre of his car or vehicle, is for such driver to hold out the hand and to indicate therewith the intended movement or operation. Such signals are often unnoticed, or given incorrectly, or are masked by intervening traffic, and are sometimes made ineffectually, particularly in the case of vehicles with closed bodies, and frequently are not given until after the intended movement is inaugurated, with the result that many serious and sometimes fatal collisions or other accidents occur, and delays caused thereby. This condition is especially likely to occur at night, or in foggy or rainy weather, where the visibility of such handmade signals is of very limited range. As the motor car traffic on the city streets is constantly and rapidly increasing, the danger of collision, accident and delays, resulting in injury and congestion of traffic, is of increasing importance.

It is among the special purposes of my present invention to provide a signal device, preferably, though not necessarily, in the form of a movable arrow, or other pointer, which, for use at night, may be brilliantly illuminated, and which is manually operable from a point convenient to the seat of the driver, to indicate to others in advance an intended change of travel or other manœuvre of the vehicle, and the direction thereof, and in such manner that all can see and observe the same and can govern themselves accordingly.

In carrying out my invention, I propose to provide a signal device in any suitable form, such, by way of illustration, as an arrow or pointer, which can be easily applied to any make or character of motor car or other vehicle, and at any suitable or convenient point on the car, and which can be manually or otherwise operated or controlled from the driver's seat to indicate the intended change in direction or other manœuvre of the driver, and which, for use at night, may be brilliantly or strikingly illuminated as, for example, in the form of a bright red light, and which, therefore, can be seen and observed at considerable distances.

In the accompanying drawings, I have shown various illustrative embodiments of my invention, wherein I am enabled to attain the objects and secure the advantages above suggested and which will be more fully set out hereinafter.

Referring particularly to Figs. 1 and 2, wherein a traffic signal device embodying my invention is shown assembled, 15 is the signal device proper, 16 a tubular member to which extend operating devices for the signal device and circuit wires, 17 a junction box connection for the tubular member, and 18 the box or casing carrying the manually operated connections for actuating and controlling the signal device and the electrical circuits therefor. The signal device 15 is adapted to be secured in any desired manner upon a car or vehicle at any desired point, say, for illustration, upon the rear of the vehicle body or the chassis frame thereof, the rear bumper, fender or other convenient part. The box or casing 18 is to be mounted on the dash plate or other suitable part in convenient relation to the driver's seat so as to be manipulated and controlled by the driver. The tubular member 16 extends from the casing 17 to the signal device 15, in such manner as to enable the signal device to be operated and controlled by suitable means extending through said member and manipulated from the driver's seat. The junction box 17 is interposed at any convenient point in the length of the member 16, and is for the purpose of receiving the circuit leads from a current source or battery to the signal device and to the control casing. The entire device is designed to be firmly clamped or otherwise secured on the car.

Referring particularly to the signal device 15, I have shown the same provided with a pointer, shown in this instance as an arrow, the purpose of which is to indicate a proposed change in direction of travel of the car by being shifted or moved into the appropriate position with reference to its mounting on the car, or to its previously occupied position. For use at night, I prefer to provide an illuminated pointer, and I have shown a simple and efficient structure for such purpose, as well as a mounting for the same, composed of parts which can be economically constructed and easily assembled. In the form illustrated, the pointer is constructed of transparent side portions 19, preferably of glass, having ground or planed off surface projections adapted to efficiently transmit and reflect the light rays from a lamp 20 which is enclosed by said side members, the latter being shown in this instance as in the form of halves of an arrow-shaped, hollow prism or lens, the halves being fitted and held together at their meeting edges by retaining channel strips 21, 22 and the lamp 20 extending up into the space between said members. The lower channel strip 22 is formed with a depending collar portion 23 arranged to fit over and to be secured to the neck portion 24 of a cap 25, rotatably mounted on a fixed base 26. This base is provided with a boss 27 into which extends one end of the pipe or conduit member 16. The cap 25 may be rotatably secured to the base 26 in any suitable manner. I have shown a simple arrangement wherein the lower edge of the cap encompasses the upper edge of the base, which latter is provided with annular slots 28 into which extend studs or pins 29 carried by the encompassing portion of the cap. The lower portion of the collar 23 is enlarged, as indicated, at 30, thereby forming an interior shoulder 31 which fits down on the upper edge surface of the neck 24. The lamp 20 is received and held in the upper end of a lamp socket 32 which is provided with studs or other forms of projections 33 which are received in seats formed in the upper edge surface of the neck 24 and are held and retained in said seats by the shoulder 31. This affords a very simple and efficient structure for assembling and mounting the signal device, which admits of quick and easy replacement of the lamp or other lamp source in case of accident or injury thereto. By employing a suitably colored lamp 20, or prisms 19, red, for example, a brilliant red light will be displayed which, in the instance shown, will be in the form of a pointer or arrow.

The lamp circuit connections may take any desired form. I have shown one terminal circuit connection 34, leading to a stud 35 and thence into the lamp socket 32, and the other circuit connection 36 leads from a binding post 37 into the lamp socket, the circuit connections to the lamp being completed in the socket in the usual or any well-known way when the lamp is applied to the socket.

Various means may be employed to effect the required or desired rotary displacements of the signal device. A simple arrangement for this purpose is shown wherein an operating rod or other form of connection 38, working through the tubular member 16, is suitably connected to the rotary cap 25 in eccentric relation with respect thereto, whereby, when said rod is actuated, the cap, and with it the lamp socket, lamp and pointer, are all rotatively moved in one direction or the other, according to the direction in which the rod or connection 38 is moved.

A simple illustrative form of connection of rod 38 to the cap is shown wherein the cap is provided with an eccentrically disposed projection 39, see Figs. 12 and 13, having a slotted arm or extension 40, in the slot of which the end of rod 38 is slidably connected. The slots 28 in which the pins 29 work serve to permit the angular displacement of the cap 25 without disconnecting the same from the base member 26.

The rod or other connection 38 may be actuated in many different ways. In Fig. 4, I have shown one arrangement for this purpose, wherein the rod 38 extends through the tube 16, and the boss 41, into which the end of the tube 16 is secured, said boss being formed in the side of the control casing 18, and into said casing, and carries a rack 42 which is engaged by a gear segment 43 carried by a stud shaft 44 which extends through the casing 18 and is provided with an operating handle 45. By turning this handle in one direction or the other the rod 38 is actuated in the required direction to properly position the signal device with reference to the contemplated change in direction. Where it is desired to operate the rod in the same direction that the operating handle 45 is actuated, the end of the rod is slidably connected to a lever arm 46, as, for instance, in a slot 47 in the free end of said arm (see Fig. 5), said arm being carried by stud shaft 48 provided with an operating handle 45. In Figs. 6 and 7 I have shown still another arrangement for operating the rod. In this instance, an angle-shaped operating arm 56 is employed which is pivoted at one end, as at 49, within the casing, the other end extending through an arcuate slot 57 in the cover of the casing 18 and provided with a hand grip 50. The rod 38 is slidably connected to the angle arm as, for instance, in the slot 51 formed therein.

If desired, a switch device, which is manually operable, for opening or closing the lamp circuit may also be mounted within the casing 18. I have shown a switch arm 52 mounted in said casing and adapted to be shifted into and out of circuit connection with a contact 53, the lamp circuit leads being connected, respectively, to said switch arm and contact. A hand grip or knob 54 connected to the switch arm extends through the casing into position to be conveniently grasped by the driver and operated to open or to close the lamp circuit. In Fig. 4 two switch arms 55 are shown for this purpose.

In order to accommodate the leads of the lamp circuit to a battery or other current source, a coupling is interposed in the tubular member 16 to form a junction box 17, into which leads the circuit wires to and from the battery and thence, respectively, to the lamp or signal device and to the switch contacts in the control casing.

It will be observed that by fitting the collar 23 over the neck portion 24 of cap 25, and by fitting the cap 25 over the upper edge of the base 26, access of rain, snow or the like to the interior of the signal device is prevented, without interfering with the rotative movements of the cap member and the pointer and lamp.

From the foregoing description it will be seen that I provide an exceedingly simple and efficient traffic signal device for motor and other cars or vehicles, wherein are attained the objects and purposes set forth.

It is to be understood that many variations and changes in the details of structure would readily occur to persons skilled in the art and still fall within the spirit and scope of my invention. I do not desire, therefore, to be limited to the exact details shown and described.

But having now set forth the objects and nature of my invention, and various structures embodying the principles thereof, what I claim as new and useful, and of my own invention, and desire to secure by Letters Patent, is:—

1. In a traffic signal device the vehicles, a base member having annular slots in its upper edge, a cap encompassing the slotted edge of said base member and having means arranged to work in said slots, a pointer carried by said cap, and means to rotatively displace said cap on said base member.

2. In a traffic signal device for vehicles, a base member, a cap rotatively mounted thereon and provided with a neck, a pointer having a collar engaging around and secured to said neck, and means to rotatively displace said cap upon said base member.

3. In a traffic signal device, a base member, a cap rotatively mounted thereon, and provided with a neck portion, a pointer having a collar, said collar having an enlarged end to telescope over said neck portion, thereby providing a shoulder to fit against the upper edge surface of said neck portion, a lamp socket disposed within said neck portion and having supporting means to be clamped by said shoulder, a lamp to illuminate said pointer, said lamp supported by said socket, and means to rotatively displace said cap upon said base member.

4. In a traffic signal device, a base member, a cap rotatively mounted thereon and provided with a neck portion, a pointer having a collar arranged to telescope over and to be secured to said neck portion, said pointer including prismatic lenses disposed side by side to form the body of said pointer, a lamp to illuminate said lenses, a socket for said lamp, means to support said socket within said neck, said cap having an eccentrically disposed projection, a rod having loose connection with said projection, and an operating handle for said rod.

In testimony whereof I have hereunto set my hand on this 20th day of June A. D., 1924.

ROBT. T. McCONLOGUE.